INVENTOR.
EGBERT KANKELEIT
BY Samuel Lindenberg
Arthur Friedrich
ATTORNEYS

United States Patent Office 3,446,962
Patented May 27, 1969

3,446,962
APPARATUS FOR RECORDING THE ABSORPTION OF GAMMA RAYS EMANATED FROM A SOURCE
Egbert Kankeleit, Darmstadt, Germany, assignor to California Institute Research Foundation, Pasadena, Calif., a corporation of California
Filed Sept. 30, 1966, Ser. No. 583,354
Int. Cl. G01t 1/34
U.S. Cl. 250—83          7 Claims

ABSTRACT OF THE DISCLOSURE

A Mossbauer spectrometer is provided wherein a gamma ray source emits gamma rays at a target which is continuously moved relative to the source with a changing velocity. Film holding means are provided which is moved in synchronism with the moving target to repeatedly bring particular portions of film directly in position for exposure only when the relative velocity of the source and the target is of a particular value.

---

This invention relates to apparatus and methods for measuring Mossbauer effect phenomena and to improvements therein.

The Mossbauer effect is the name given to the phenomenon of recoil-free gamma-ray resonance absorption. When an atomic nucleus decays from an excited state to the ground state, a gamma ray may be mitted. The energy of the gamma ray would be equal to the energy difference between the excited and ground states, E, if no energy were absorbed by the emitting atom. If a gamma ray of energy E were to travel to a piece of target material and strike an atom thereof having a nucleus of the same type as the emitter atoms, the struck or absorbing atom might be raised from the ground state to the excited state. If the gamma ray is of the exact energy required to raise the absorbing nucleus to the excited state, the absorption is very strong, and this phenomenon is called resonance absorption.

Resonance absorption is generally not observed because the energy of the gamma ray is not equal to the energy difference of the excited and ground states E, but instead is reduced by the kinetic energy R, imparted to the emitting atom. The kinetic energy of the atom results from the law of conversation of momentum which requires that the atom recoil. Furthermore, even if a gamma ray of energy E struck a nucleus of the target material of the same type as the emitting atom nucleus, the absorbing nucleus would not be raised to the excited state because the absorbing atom would recoil and absorb kinetic energy of an amount R. The energy difference 2R expanded in recoiling the emitting and absorbing atoms is generally much greater than L, the natural width of the absorption band, and resonant absorption is not generally observed.

Rudolf Mossbauer discovered that if the emitting atom were firmly held in a crystal lattice, the recoil momentum could be taken up by the entire crystal and very little recoil energy would be given up by the gamma ray during emission. Similarly, if the absorbing atom were held in a crystal lattice, very little recoil energy would be given up during absorption. The loss of energy by atom recoil in these cases is much smaller than the natural width of absorption, L, and resonance absorption is observed.

The natural width L is very sharp, and even small variations in source energy (i.e. frequency) can destroy it. For example, in the most commonly studies isotope $Fe^{57}$ the gamma rays have energies E of 14.4 kev. (frequency of $3.50 \times 10^{18}$ c./s.) while L is $4.6 \times 10^{-12}$ kev., so the Q of the resonance is $3.1 \times 10^{+12}$.

If the source energy is shifted slightly, resonance can be restored by moving the source relative to the absorber, or target, the resulting Doppler shift compensating for the change in source energy. Small velocities, generally less than 10 cm./sec. are sufficient to restore resonance in many applications. By measuring the Doppler shift necessary to restore resonance, one can determine the source energy shift. The measurement of extremely small energy shifts in gamma ray sources, which are generally radioactive isotopes, is the primary use of the Mossbauer effect. The Mossbauer effect has been used to measure energy shifts due to variations in gravity predicted by Einstein's theory of relatively, to study nuclear hyperfine structure, and in other applications.

In observing nuclear energy shifts by measuring the Doppler shifts required to restore resonance, the amount of gamma ray emanating from the target (by reason of lack of absorption) must be measured while the target moves toward the source at a particular speed. If the target moves at an appreciable speed, it can move for only a very short period of time before reaching the source or getting so far away that very few gamma rays strike the target and can pass through to the detector. Furthermore, in order to determine what the energy shift is, the gamma ray absorption must be measured at many speeds until a speed or speeds are found at which absorption occurs. The difficulties and complexity of equipment required to make such measurements has generally hampered the measurement using the Mossbauer phenomenon.

Accordingly, one object of the present invention is to provide apparatus and methods for measuring changes in gamma ray source energy by means of Doppler shifts, which are of greater simplicity than apparatus and methods available heretofore.

Another object is to provide apparatus and methods for measuring gamma ray absorption versus relative velocity of target and gamma ray source for sources of low gamma ray output, which are simpler and more economical than those available heretofore.

Yet another object is to provide simple apparatus and methods for obtaining a visual display of the absorption versus relative velocity of target and source characteristics in Mossbauer spectroscopy.

The foregoing and other objects are realized in one embodiment of the invention by apparatus which employs photographic film to detect gamma rays pasisng through, or emanating from, a target bombarded by gamma rays from a radioactive source. The film is separated from the target by a gamma ray stopping mask which has a narrow slit to allow only a narrow rectangle of film to be exposed to the rays. The target moves toward and away from the source with sinusoidal motion. The film is mounted on a drum which rotates in synchronism with the oscillations of the target. The target and drum are so connected that a particular portion of film is moving directly behind the slit opening whenever the target is moving with a particular velocity. Thus, each portion of the film is exposed only during a particular target velocity, and the degree of exposure of each film area represents the exposure for one velocity of the target. When a strip of film is removed from the drum, narrow lines of low exposure appears which represent those velocities at which there is resonant absorption by the target.

The apparatus of the invention allows the measurement of absorption for sources of low gamma ray output because the film can be exposed over periods of hours or longer. As long as the film holding drum rotates at a constant speed (and the synchronously tied target therefore oscillates in the same velocity position pattern) each area of the film is exposed to emissions at a single target velocity. After sufficient time elapses to properly expose the film, it is developed and a permanent record of velocity vs. absorption is obtained.

A more complete understanding of the invention may be had from the following description and claims when taken in conjunction with the accompanying drawings wherein:

Figure 1:
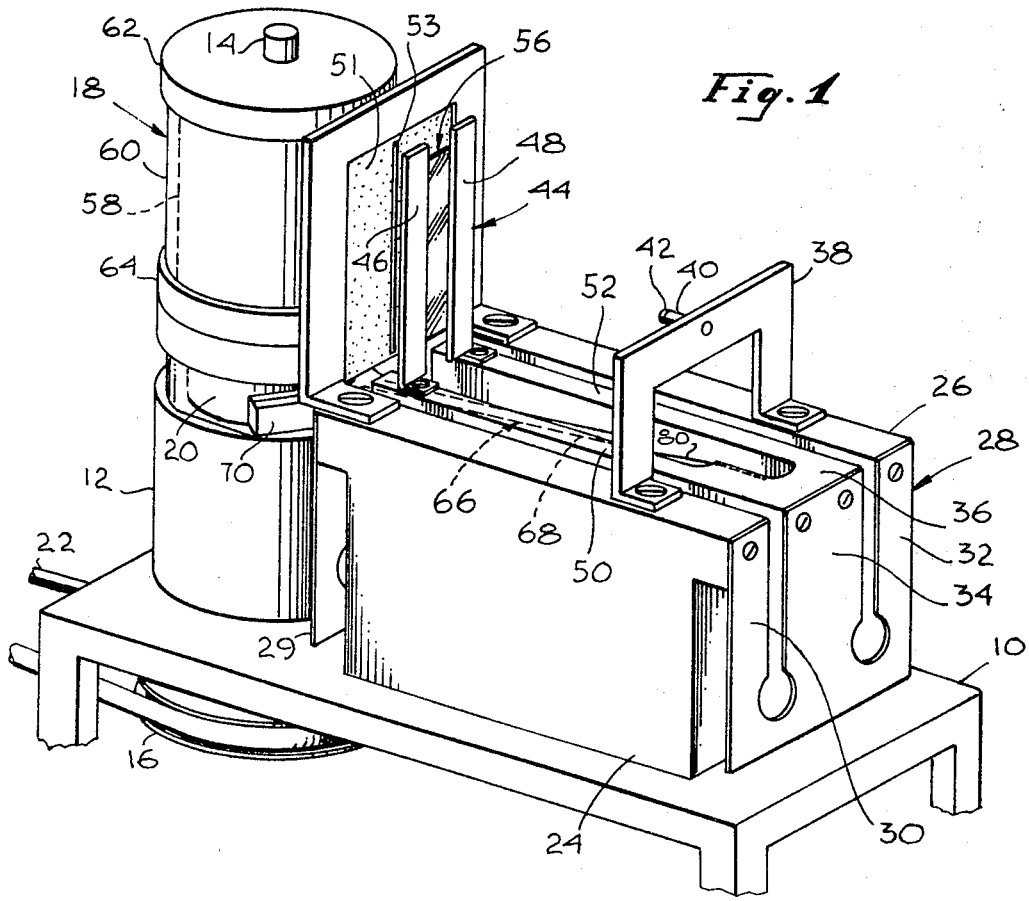
FIGURE 1 is a perspective view of one embodiment of the invention.

The embodiment of the invention illustrated in FIGURE 1 comprises a base 10, a long bearing 12 fixed to the base, a shaft 14 extending through the bearing and base and carrying a pulley 16 at one end and a drum assembly 18 at the other end and a cam 20 at its center portion. A belt 22 running around the pulley, and driven by a motor (not shown), rotates the shaft 14, and therefore also the drum assembly 18 and cam 20 at a constant speed.

Two supports 24 and 26 are fixed to the base 10. Two E-shaped leaf springs 28 and 29 are provided. Each leaf spring has two outer branches 30 and 32 fixed to the top of supports 24 and 26 respectively. A U-shaped platform 36 is fixed at its base to the center arm 34 of the leaf spring 28 and at the ends of its arms to the center arm of the leaf spring 29. Thus, the platform 36 can be moved longitudinally back and forth, but is spring biased toward a particular position.

A source holding cross arm 38 has legs mounted on the supports 24 and 26. A rod 40 fixed to the cross arm 38 holds a portion of radioactive material 42 such as 8 millicurie of $Co^{57}$ disposed on a disc of chromium. Thus, the gamma ray source 42 is held stationary above the base 10.

A target holding assembly 44 has legs 46 and 48 fixed to each branch 50 and 52 of the U-shaped platform 36. An absorber, or target 56 is mounted, by any suitable means, between the legs of the target holding assembly. The target 56 is effectively a sandwich in which for example a 1 mil per $cm.^2$ $Fe^{57}$ enriched metal foil is enclosed between 2 mil of type 302 stainless steel and 1 mil of type 302 stainless steel. The 2 mil type 302 stainless steel is on the side closest to the radioactive source 42.

An adjustable slit collimator 51 is positioned close to the drum 18. Its slit 53 is located in line with the source 42 and the target 56.

The drum assembly 18 comprises a cylinder indicated at 58 fixed to the shaft 14, for holding a sheet or strip of photographic film in at least a partial cylindrical configuration. A cardboard tube 60 is disposed about the cylinder and film to hold the film in place and prevent its exposure by light while enabling gamma rays to expose the film. Metal end cups 62 and 64 disposed over the ends of the cylinder and cardboard tube provide a light tight enclosure. As the shaft 14 rotates the entire drum assembly 18 rotates and repeatedly brings different portions of the film behind the slit 53 for exposure to gamma rays.

Figure 2:
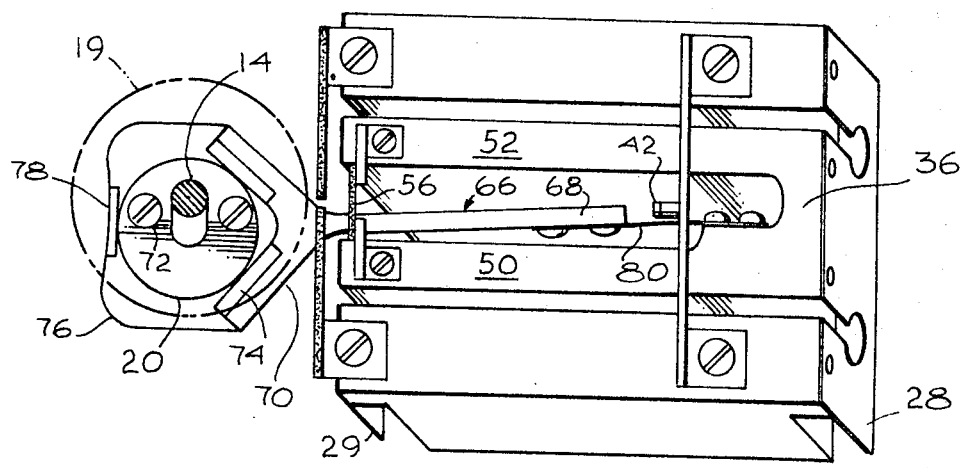
FIGURE 2 is a partially sectional perspective view of the embodiment in FIGURE 1.

The U-shaped platform 36 is forced to oscillate in synchronism with the rotation of the shaft 14 by means of a connecting rod 66 tied at one end 69 to the platform 36 and engaged at the other cam follower end 70 with the cam 20. A more detailed illustration of this arrangement is given in FIGURE 2 wherein the drum assembly is removed, and its relative position is indicated at 19. The cam 20 is of cylindrical shape, and is held in an eccentric position by bolts 72 fastened to a flange (not shown) of the shaft 14. The amount of eccentricity can be adjusted by shifting the cam 72 while the bolts are loosened. The end 70 of the connecting rod has a forked shape and carries two Teflon inserts 74 which bear against the cam 20. A spring 76 carrying a Teflon bearing block 78 extends about the cam and firmly ties the connecting rod to the cam. The opposite end 68 of the connecting rod is tied to the platform 36 by a thin leaf spring 80.

As the shaft 14 and cam 20 rotate, the cam follower end 70 of the connecting rod moves with it. The motion of the rod 66 can be described as including a component which is back and forth along the length of the U-shaped platform 36, a rotational or pivoting component. The E springs 28 and 29 constrain the platform to move only in a longitudinal direction, and only this component of connecting rod motion is transmitted to the platform 36. For constant rotation of the shaft 14, the platform 36 moves with harmonic motion, that is, its speed at any position is proportional to the cosine of its longitudinal position, with the center position being taken as 0 and the extreme positions of travel being considered as angles of plus or minus 90°. The speed and direction of motion, i.e. the velocity of the platform 36 has a particular value at every position of the platform, for any given speed of rotation of the shaft 14.

The particular portion of film lying directly behind the slit 53 has a direct correspondence with the angular position of the shaft 14. Similarly, the position and therefore also the velocity of the platform, for a given shaft speed, has a direct correspondence with the angular position of the shaft. Accordingly, a particular portion of film lies directly behind the slit 53 when and only when the platform 36 is moving with a particular velocity, for a given speed of shaft rotation and a film strip that extends 360° about the cylinder 58. Where the film strip extends less than 360° about the cylinder, each section of film is positioned behind the slit only for a particular platform speed (for a given shaft speed).

To make a determination of the relative speed of radioactive source 42 to target 56 at which resonance absorption occurs, an unexposed strip of photographic film is mounted on the cylinder 58 and the cardboard tube 60 is positioned over it. The motor is then energized to drive the shaft 14 at a constant speed. A flywheel may be fastened to the shaft to assure a more constant speed, when variations are likely to occur. The particular speed required is that which causes the platform 36 to move with a maximum speed which is greater than the speed at which resonant absorption is expected to occur. The platform speed also can be varied by changing the eccentricity of the cam 20. The platform velocity corresponding to any portion of the film can be calculated from the geometry of the apparatus.

After the drum assembly 18 has been rotating at constant velocity for a period of time sufficient to adequaely expose the film, considering the radioactivity of the source 42, its distance from the target and drum assembly, and other factors, the film is removed and developed. Lines will normally appear on the developed film in Mossbauer effect experiments, indicaing velocities at which resonant absorption occurred. The particular velocites are determined by the position of the particular area of film on the cylinder.

Tests have been made using 8 millicurie of $Co^{57}$ as a source mounted at an average distance of one inch from typical medical X-ray film, with 2 mils of type 302 stainless steel foil, a metal foil which is enriched with 1 milligram of $Fe^{57}$ per $cm.^2$ and 1 mil of type 302 stainless steel as the target. The apparatus was run for several hours and the film then developed. The film clearly displayed the well known 6-line spectrum of iron metal.

While a particular embodiment of the invention has been described in detail, many variations will occur to those skilled in the art, and the invention is limited only by a just interpretation of the following claims.

What is claimed is:

1. A Mossbauer spectrometer comprising:
   a gamma ray source;
   a target;
   moving means for repeatedly moving said target relative to said source with changing velocities;
   film holding means for holding photographic film on a side of said target opposite said source, and for exposing only limited portions of said film at any particular time; and film moving means for moving said film in synchronism with said moving means to repeatedly bring particular portions of film directly in position for exposure only when the relative velocity of said source and target is of a particular value, whereby to establish a correspondence between areas of the film and relative velocity of said source and target.

2. A Mossbauer spectrometer as defined in claim 1 wherein:
   said moving means moves said target and source toward and away from each other with harmonic motion;
   said film holding means is constructed for holding film in at least a partial cylindrical configuration and said film moving means is a turntable which rotates at an essentially constant speed.

3. A Mossbauer spectrometer as defined in claim 1 wherein:
   said film holding means comprises a cylinder having an axis disposed substantially transverse to an imaginary line connecting said source and said film holding means, for holding film in at least a partial cylindrical configuration, and a stationary slit for exposing only a narrow rectangular portion of film at one time; and
   said film moving means comprises a turntable for rotating said cylinder about its axis.

4. In a Mossbauer spectrometer, wherein a gamma ray source is moved relative to a target, the improvement comprising:
   moving means for repeatedly moving said source relative to said target with a repetitious velocity-position relationship;
   a photographic film means disposed adjacent said target; and
   means for exposing only particular areas of said film for each position of said source-target combination, and for repeatedly making said exposures, whereby to provide a film record showing the relationship of velocity to radiation emission.

5. The improvement in Mossbauer spectrometers defined in claim 4 wherein:
   said source is mounted on a base;
   said target is mounted on a platform for movement toward and away from said source;
   said moving means comprises a rotating cam and a connecting rod means engaged with said cam and with said platform for reciprocating said platform as said cam rotates; and
   said means for exposing only particular areas of said film comprises a cylinder means for holding said film, said cylinder connected to said cam for rotation in synchronism with said cam, and a slit means for exposing only limited portions of said film.

6. A Mossbauer spectrometer comprising:
   a base;
   a shaft means rotatably mounted on said base;
   means for driving said shaft at constant rotational speed;
   a cylinder means mounted on said shaft means for holding photographic film thereabout;
   a cam mounted on said shaft;
   a platform disposed on said base;
   means for constraining said platform to reciprocatory motion toward and away from said cylinder means;
   a source of radiation disposed on said platform;
   a radiation absorbing material disposed on said base between said source and said film;
   slit means for limiting the exposure of said film to a limited area thereof at any instant disposed between said absorbing material and said cylinder; and
   cam follower means engaged with said cam and said platform for reciprocating said platform as said cylinder rotates.

7. A Mossbauer spectrometer as defined in claim 6 wherein:
   said cam is a circle having a center spaced from the axis of said shaft, whereby to cause said platform to move with harmonic motion.

References Cited

UNITED STATES PATENTS

| 3,146,624 | 9/1964 | Talbot | 250—84 |
| 3,193,683 | 7/1965 | Reiffel | 250—106 |

RALPH G. NILSON, *Primary Examiner.*

M. J. FROME, *Assistant Examiner.*

U.S. Cl. X.R.

250—84, 106